(12) United States Patent
Yu et al.

(10) Patent No.: US 11,600,113 B2
(45) Date of Patent: Mar. 7, 2023

(54) DEEP FACE RECOGNITION BASED ON CLUSTERING OVER UNLABELED FACE DATA

(71) Applicant: NEC Laboratories America, Inc., Princeton, NJ (US)

(72) Inventors: Xiang Yu, Mountain View, CA (US); Manmohan Chandraker, Santa Clara, CA (US); Kihyuk Sohn, Fremont, CA (US); Aruni RoyChowdhury, Amherst, MA (US)

(73) Assignee: NEC Corporation

( * ) Notice: Subject to any disclaimer, the term of this patent is extended or adjusted under 35 U.S.C. 154(b) by 222 days.

(21) Appl. No.: 17/091,066

(22) Filed: Nov. 6, 2020

(65) Prior Publication Data
US 2021/0142046 A1  May 13, 2021

Related U.S. Application Data

(60) Provisional application No. 62/934,617, filed on Nov. 13, 2019.

(51) Int. Cl.
| | | |
|---|---|---|
| *G06V 40/16* | (2022.01) | |
| *G06K 9/62* | (2022.01) | |
| *G06N 3/04* | (2006.01) | |
| *G06N 3/08* | (2006.01) | |

(52) U.S. Cl.
CPC ......... *G06V 40/173* (2022.01); *G06K 9/6226* (2013.01); *G06K 9/6257* (2013.01); *G06N 3/04* (2013.01); *G06N 3/08* (2013.01)

(58) Field of Classification Search
CPC ...... G06K 9/6226; G06K 9/6257; G06N 3/04; G06N 3/0454; G06N 3/08; G06V 10/763;
(Continued)

(56) References Cited

U.S. PATENT DOCUMENTS

| | | | | |
|---|---|---|---|---|
| 10,025,950 B1 * | 7/2018 | Avasarala | ............ | G06V 10/454 |
| 2018/0144746 A1 * | 5/2018 | Mishra | ................. | G06V 40/172 |

(Continued)

OTHER PUBLICATIONS

Charles Otto, "Clustering Millions of Faces by Identity," IEEE Transactions on Pattern Analysis and Machine Intelligence, vol. 40, No. 2, Feb. 2018, pp. 1559-1563.*

(Continued)

*Primary Examiner* — Omar S Ismail
(74) *Attorney, Agent, or Firm* — Joseph Kolodka

(57) ABSTRACT

A computer-implemented method for implementing face recognition includes obtaining a face recognition model trained on labeled face data, separating, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data, clustering the one or more disjoint unlabeled faces using a graph convolutional network to generate one or more cluster assignments, generating a clustering uncertainty associated with the one or more cluster assignments, and retraining the face recognition model on the labeled face data and the unlabeled face data to improve face recognition performance by incorporating the clustering uncertainty.

17 Claims, 4 Drawing Sheets

(58) Field of Classification Search
CPC .. G06V 10/764; G06V 10/7747; G06V 10/82; G06V 40/173
See application file for complete search history.

(56) References Cited

U.S. PATENT DOCUMENTS

| | | | |
|---|---|---|---|
| 2018/0189581 A1* | 7/2018 | Turcot | G06N 3/0454 |
| 2020/0089966 A1* | 3/2020 | Tsai | G06V 10/774 |
| 2021/0256281 A1* | 8/2021 | Henson | G06F 21/32 |

OTHER PUBLICATIONS

Jianlong Wu, "Deep Comprehensive Correlation Mining for Image Clustering," Oct. 2019, Proceedings of the IEEE/CVF International Conference on Computer Vision (ICCV), 2019 ,pp. 8150-8157.*

Kun Liu, "Steel Surface Defect Detection Using a New Haar-Weibull-Variance Model in Unsupervised Manner,"Sep. 13, 2017 , IEEE Transactions on Instrumentation and Measurement, vol. 66, No. 10, Oct. 2017,pp. 2585-2593.*

Simone Bianco, "Single and Multiple Illuminant Estimation Using Convolutional Neural Networks,"IEEE Transactions on Image Processing, vol. 26, No. 9, Sep. 2017,pp. 4347-4359.*

Mohamed S. Abdallah, "Zero-Shot Deep Learning for Media Mining: Person Spotting and Face Clustering in Video Big Data,"Nov. 22, 2019, Electronics 2019, 8(12), 1394; https://doi.org/10.3390/electronics8121394,pp. 1-13.*

Yang et al., "Learning to Cluster Faces on an Affinity Graph", Nanyang Technological University, Apr. 2019, pp. 1-9.

Zhan et al., "Consensus-Driven Propagation in Massive Unlabeled Data for Face Recognition", SenseTime Joint Lab, The Chinese University of Hong Kong, Sep. 2018, pp. 1-16.

* cited by examiner

400

Obtain a face recognition model trained on labeled face data
410

↓

Separate, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data
420

↓

Cluster the one or more disjoint unlabeled faces using a graph convolutional network to generate one or more cluster assignments, including assigning a pseudo-label corresponding to a cluster assignment to each of the one or more disjoint unlabeled faces to obtain one or more pseudo-labeled samples
430

↓

Generate a clustering uncertainty associated with the one or more cluster assignments
440

Implement the face recognition model to perform a face recognition task
460

↑

Retrain the face recognition model on the labeled face data and the unlabeled face data by incorporating the clustering uncertainty
450

Feed the labeled face data and the one or more pseudo-labeled samples into a neural network
452

↓

Attenuate a training loss of the one or more pseudo-labeled samples by using the clustering uncertainty and an output of the neural network to obtain a weighted training loss
454

FIG. 4

DEEP FACE RECOGNITION BASED ON CLUSTERING OVER UNLABELED FACE DATA

RELATED APPLICATION INFORMATION

This application claims priority to provisional application Ser. No. 62/934,617, filed on Nov. 13, 2019, incorporated by reference herein in its entirety.

BACKGROUND

Technical Field

The present invention relates to artificial intelligence and machine learning, and more particularly to deep face recognition.

Description of the Related Art

Face recognition, such as deep face recognition, seeks to map input images to a feature space with small intra-identity distance and large inter-identity distance. Deep face recognition has achieved high performance, benefitting from large-scale labeled data. Further improvements to face recognition performance can be achieved via increased annotation efforts that require further enlarging labeled dataset volume, which can be impractical and labor intensive.

SUMMARY

According to an aspect of the present invention, a computer-implemented method is provided for implementing face recognition. The computer-implemented method includes obtaining a face recognition model trained on labeled face data, separating, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data, clustering the one or more disjoint unlabeled faces using a graph convolutional network to generate one or more cluster assignments, including assigning a pseudo-label corresponding to a cluster assignment to each of the one or more disjoint unlabeled faces to obtain one or more pseudo-labeled samples, generating a clustering uncertainty associated with the one or more cluster assignments, and retraining the face recognition model on the labeled face data and the unlabeled face data to improve face recognition performance by incorporating the clustering uncertainty.

According to another aspect of the present invention, a system is provided for implementing face recognition. The system includes a memory device storing program code and at least one processor device operatively coupled to the memory device. The at least one processor device is configured to execute program code stored on the memory device to obtain a face recognition model trained on labeled face data, separate, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data, cluster the one or more disjoint unlabeled faces using a graph convolutional network to generate one or more cluster assignments by assigning a pseudo-label corresponding to a cluster assignment to each of the one or more disjoint unlabeled faces to obtain one or more pseudo-labeled samples, generate a clustering uncertainty associated with the one or more cluster assignments, and retrain the face recognition model on the labeled face data and the unlabeled face data to improve face recognition performance by incorporating the clustering uncertainty.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a block/flow diagram illustrating a system/method for implementing face recognition, in accordance with an embodiment of the present invention.

DETAILED DESCRIPTION OF PREFERRED EMBODIMENTS

Figure 1:
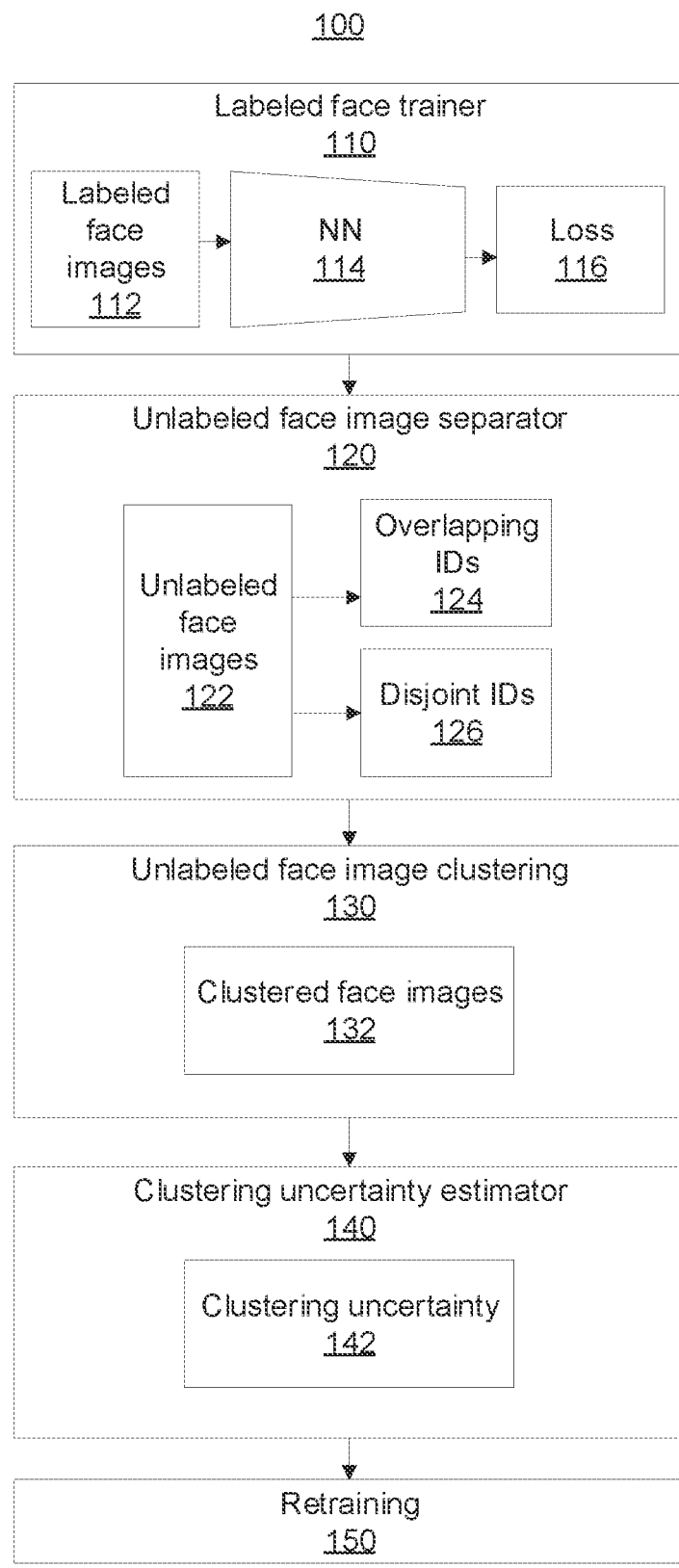
FIG. 1 is a block/flow diagram illustrating a high-level overview of a face recognition framework, in accordance with an embodiment of the present invention.

In accordance with embodiments of the present invention, systems and methods are provided for deep face recognition based on clustering over unlabeled face data. More specifically, given a deep face recognition model trained on labeled faces (e.g., large-scale labeled datasets), the embodiments described herein can exploit clustering on unlabeled face data for additional training samples to further improve deep face recognition performance. The embodiments described herein can address real-world challenges such as, e.g., overlapping identities between labeled and unlabeled data, as well as attenuating the effect of noisy labels when training on pseudo-labeled data. For example, overlapping identities can be addressed as an extreme value theory-based problem by formulating the problem as an out-of-distribution detection problem, parameterized with a mixture of Weibull distributions. To compensate for the label noise introduced by clustering procedure, cluster assignment uncertainty can be modeled and incorporated into the re-training of the deep face recognition network(s).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now in detail to the figures in which like numerals represent the same or similar elements and initially to FIG. 1, a high-level block/flow diagram is provided illustrating an exemplary face recognition framework 100. As will be described in further detail below, the framework 100 is configured to improve the training and performance of a supervised face recognition model by clustering unlabeled face images, and retraining on both labeled and unlabeled face images using cluster assignments as pseudo-labels on additional unlabeled data.

As shown, the framework 100 includes a plurality of components, including a labeled face trainer 110, an unlabeled face separator 120, an unlabeled face clustering component 130, a clustering uncertainty estimator 140, and a retraining component 150.

The labeled face trainer 110 is configured to receive a set of labeled face images 112 and train a neural network (NN) 114, which generates a training loss ("loss") 116. In one embodiment, the NN 114 can be a deep neural network. In this embodiment, the NN 114 can be trained on the set of labeled face images 112 in a fully-supervised fashion as a baseline. For example, the set of labeled face images 112 can include a large-scale labeled dataset. In one embodiment, the set of labeled face images 112 can include human face images. However, such an embodiment should not be considered limiting, and the embodiments described herein can be applied to perform face recognition training with respect to any suitable face images. Accordingly, the training performed by the labeled face trainer 110 can be semi-supervised face recognition training.

Generally, there is no control over the gathering of unlabeled data, so a same subject S may exist in labeled data (and thus be a class on which the baseline face recognition engine is trained) and within unlabeled data. That is, unlabeled face images may contain identities (IDs) already existing in the set of labeled face images 112. As will be described in further detail below, unlabeled face images can be clustered and cluster assignments will be assigned to respective ones of the unlabeled face images as "pseudo-labels." By default, the clustering can assign images of the subject S in the unlabeled data as a new category. In this case, upon retraining with the additional pseudo-labeled data, the network can incorrectly learn to classify images of the subject S into two categories. This is an important consideration, since overlapping subjects can occur naturally in datasets collected from the Internet or recorded through passively mounted image capturing devices (e.g., cameras).

To address at least these above issues, the unlabeled face image separator 120 is configured to separate a set of unlabeled face images 122 into a set of face images having overlapping IDs or classes between labeled and unlabeled face images ("overlapping IDs") 124, and a set of face images having disjoint IDs or classes between labeled and unlabeled face images ("disjoint IDs") 126.

The separation problem solved by the unlabeled face image separator 120 can be regarded as an "out-of-distribution detection problem," with an intuition that unlabeled face images with overlapping identities will have high confidence scores from a face recognition engine, as the same labeled data is used to train the face recognition engine. Since the softmax operation over several thousand categories can result in small values due to normalization, a maximum logit ("max-logit") for each unlabeled face image can be used as its corresponding confidence score. Therefore, thresholds of the confidence scores that can separate disjoint and overlapping IDs are searched for. Since we may be dealing with the maxima over a large number of classes, we can draw upon results from extreme value theory (EVT). The Fisher-Tippet theorem, also known as the extreme value theorem, provides that the limiting distribution of the maxima of independent and identically distributed (i.i.d.) random variables can converge to an extreme value distribution corresponding to one of a Gumbel distribution, a Fréchet distribution or a Weibull distribution. A mixture of extreme value distributions (e.g., Weibull distributions) can be used to perform on-the-fly separation of the set of overlapping IDs 124 and the set of disjoint IDs 126 from the set of unlabeled face images 122.

As an illustrative example, the max-logits can be modeled using a Weibull distribution as follows:

$$f(x; \lambda, k) = \begin{cases} \frac{k}{\lambda}\left(\frac{x}{\lambda}\right)^{k-1} e^{-(x/\lambda)^k} & x \geq 0 \\ 0 & x < 0 \end{cases} \quad (1)$$

where k>0 denotes a shape parameter and λ>0 denotes a scale parameter. An initial threshold on the distribution of max-logit scores can be obtained. For example, Otsu's method can be used to perform automatic image thresholding to obtain the initial threshold on the distribution of max-logit scores. However, any suitable image thresholding method can be used in accordance with the embodiments described herein. Then, a two-component mixture of Weibull distributions can be fit, initialized to the upper and lower parts of the distribution, thereby modeling the overlapping and disjoint classes, respectively. Selecting values corresponding to the 95% confidence under each Weibull model provides two thresholds, one for disjoint samples and one for overlapping samples, separately with high confidence. Samples that fall outside of this interval are then rejected. This approach does not require setting any hyperparameters a priori, and can be applied to any new unlabeled dataset.

Now that the images of the set of unlabeled face images 122 have been separated, the unlabeled face image clustering component 130 is configured to cluster the unlabeled face images of the set of disjoint IDs 126 to generate a set of clustered (unlabeled) face images 132 having respective cluster assignments. The cluster assignments can be viewed as "pseudo-labels" or "pseudo-identities" assigned to the unlabeled face images. As will be described in further detail below, the cluster assignments/pseudo-labels corresponding to additional unlabeled face images will be incorporated during retraining of the face recognition network.

In one embodiment, the unlabeled face image clustering component 130 can be configured to implement a graph convolution network (GCN) to cluster the unlabeled face images. More specifically, the clustering can leverage a GCN for large-scale face clustering using the pseudo-labels. For example, the unlabeled face image clustering component 130 can be configured to implement Face-GCN. Based on features extracted from a pretrained face recognition engine, Face-GCN can construct a nearest-neighbor graph over all samples, where Euclidean distance can be used as the affinity measure. By setting various thresholds on the edge weights of this graph, a set of connected components or cluster proposals are generated. During training, the aim is to regress the precision and recall of the proposals arising from a single ground truth identity. Since the proposals are generated based on labeled face images, the Face-GCN can be trained in a fully supervised way. This is unlike the regular training of GCNs, which are typically trained with a classification loss, either for each node or an input graph as a whole. During testing, a "de-overlap" procedure similar to non-maximum suppression in object detection, can use predicted GCN scores for the proposals to partition an unlabeled dataset into a set of clusters.

Noisy training labels can arise from incorrect clustering assignments generated by the unlabeled face image clustering component 130. For example, a picture of former President of the United States George H. W. Bush can be erroneously assigned to a cluster of face images of his son and former President of the United States George W. Bush. Such label noise can be a source of face recognition performance deterioration.

To compensate for label noise introduced by clustering procedure and thus improve face recognition performance, the clustering uncertainty estimator 140 is configured to estimate incorrect cluster assignments to generate an estimate of clustering uncertainty ("clustering uncertainty") 142 corresponding to an unsupervised label noise estimation. The clustering uncertainty 142 will be incorporated into the retraining of the face recognition network by weighting the training loss to reduce the effect of erroneous gradients caused by the noisy labeled data. The clustering uncertainty 142 does not require a clean labeled dataset to learn a training curriculum, and thus can be applied out-of-the-box.

The retraining component 150 is configured to retrain the face recognition model based on the set of labeled face images 112, pseudo-labeled face images corresponding to the set of clustered face images 132, and the clustering uncertainty 142. When retraining the labeled and pseudo-labeled data, the uncertainty of whether a pseudo-labeled face image was correctly labeled can be incorporated.

Further details regarding the retraining component 150 will now be described below with reference to FIG. 2.

Figure 2:
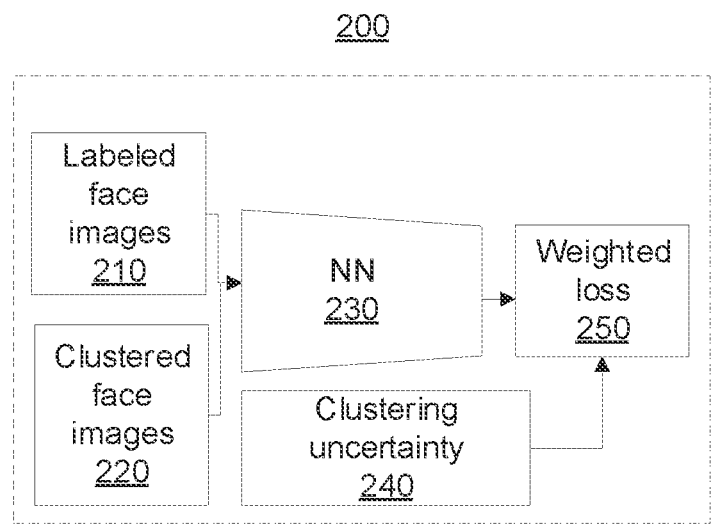
FIG. 2 is a diagram illustrating a retraining component of the face recognition framework of FIG. 1, in accordance with an embodiment of the present invention.

Referring now to FIG. 2, a block/flow diagram is provided illustrating an exemplary retraining component 200. For example, the retraining component 200 can be implemented as the retraining component 150 of FIG. 1.

As shown, a set of labeled face images 210 and a set of clustered face images 220 are fed into a neural network (NN) 230, which are similar to the set of labeled face images 112, the set of clustered face images 12, and the NN 114, respectively, of FIG. 1. Retraining the original face recognition model on the union of the set of labeled face images 210 and the pseudo-labeled face images of the set of clustered face images 220 can improve face recognition performance.

Training loss associated with the effect of noisy labels when training can be attenuated by using the clustering uncertainty 240 (similar to the clustering uncertainty 142 of FIG. 1) to generate a weighted loss 250. More specifically, the weighted loss 250 corresponds to a weighted training loss. Accordingly, incorporation of the clustering uncertainty 240 can smooth the retraining procedure and thus further improve face recognition performance.

As an illustrative example of the framework described above with reference to FIGS. 1 and 2, let $x_i$ be an unlabeled face image drawn from a set of unlabeled face images, dataset $X^U$, such that $x_i \in X^U$. The feature representation for the unlabeled face image $x_i$ using the baseline supervised model can be denoted as $\Phi(x_i)$. Let the cluster assignments obtained on $X^U$ be $\{C_1, C_2, \ldots, C_K\}$ for K clusters. A logistic regression model can be trained to estimate the probability distribution $P(C_K|\Phi(x_i))$, for k=1, 2, ... K. For example, $$P(C_K|\Phi(x_i)) = \frac{\exp(\omega_k^T \Phi(x_i))}{\sum_j \exp(\omega_j^T \Phi(x_i))} \quad (2)$$

where $\omega_k$ are the logistic regression weights for the k-th class or cluster. Intuitively, we wish to determine how well a simple linear classifier on top of discriminative face descriptors can fit the cluster assignments.

The following three uncertainty metrics on the logistic regression outputs can be compared: (1) entropy of the posteriors across the K classes/clusters (e.g., $\Sigma_k P(C_K|\Phi(x_i))$ log $P(C_K|(x_i))$; (2) max-logit, or the largest logit value over the K classes/clusters, similar to what was used above for separating disjoint and overlapped IDs; and (3) classification margin, which is the difference between the maximum and the second-maximum logit, and measures how easily a sample can switch the label between two clusters.

The following are two kinds of incorrect pseudo-labels from clustering, corresponding to notions of precision and recall, that can be considered: (1) outliers, whose identity does not belong to the identity of the cluster; and (2) split-ID, in which samples from the same ID are spread across several clusters. In a controlled setting, where the ground-truth IDs of clustered face images are known, a hypothesis can be validated that measures of uncertainty from the logistic regression model can distinguish between correct and incorrect cluster assignments. It can be observed that split-ID makes up the bulk of incorrectly-clustered samples (e.g., outliers can comprise about 10% of incorrectly-clustered samples).

Intuitively, samples that do not have a large classification margin are likely to be incorrect pseudo-labels. Given a measure of uncertainty that correlates with a cluster assignment being correct, a bimodal distribution separation can be expected (e.g. noisily labeled samples would be in one mode, and correctly labeled samples in the other mode). This is another distribution separation problem, similar to the distribution problem of separating overlapping IDs and disjoint IDs described above. Thus, an extreme value distribution (e.g., Weibull distribution) can be fit to the lower portion of a bimodal class margin distribution, where an initial threshold separating two modes is obtained (e.g., using Otsu's method). If $p^-(x_i)$ denotes the probability of sample $x_i$ being incorrectly clustered (or incorrect labeling probability), $p^-(x_i)$ can be estimated as follows:

$$p^-(x_i) = P(g(x_i)|\theta_{W^b^-}) \quad (3)$$

where $\theta_{W^b^-}$ are the parameters of the learned extreme value (e.g., Weibull) distribution, and $g(\cdot)$ denotes the measure of uncertainty (e.g., class-margin). Note that at no point of the extreme value distribution fitting do we need access to ground-truth labels.

The above uncertainty can then be associated with the clustered/pseudo-labeled samples to set up a probabilistic face recognition loss. For example, the following cosine loss can be used:

$$L(x_i) = -\log \frac{\exp(\alpha \omega_j^T x_i - m)}{\exp(\alpha \omega_j^T x_i - m) + \sum_{k \neq j} \exp(\alpha \omega_k^T x_i)} \quad (4)$$

where $x_i$ is the i-th training sample, $w_j$ is the learned classifier weight for the j-th class, m is the loss margin to squeeze the j-th class boundary, and $\alpha$ is a temperature tuned for convergence. For $x_i \in X^U$, the incorrect labeling probability $p^-(x_i)$ can be associated to compensate the penalty as follows:

$$L^P(x_i) = (1-p^-(x_i))^\gamma L(x_i) \quad (5)$$

where $\gamma$ is a parameter corresponding to an importance weight assigned to each pseudo-labeled sample depending on its likelihood under the extreme value distribution (e.g., Weibull), which controls the shape of the weighting curve following a power law. The parameter $\gamma$ controls the weighting for loss and can be used to tune weighting importance. That is, if the uncertainty $p^-(x_i)$ is high, y can be tuned small to prevent sample loss $L(x_i)$ for the overall loss $L^P(x_i)$. For example, if $p^-(x_i)=0.1$, then $(1-p^-(x_i))^\gamma=(1-0.1)^\gamma=(0.9)^\gamma$. If $\gamma$ is set to be large, the weight $(0.9)^\gamma$ can be tuned to be smaller, and thus the overall loss term for the current sample $x_i$ is smaller. If $\gamma$ is set to be small, the loss term for the current sample $x_i$ is larger.

The face recognition model trained in accordance with the embodiments described above with reference to FIGS. 1 and 2 can be implemented to perform face recognition within any environment.

Figure 3:
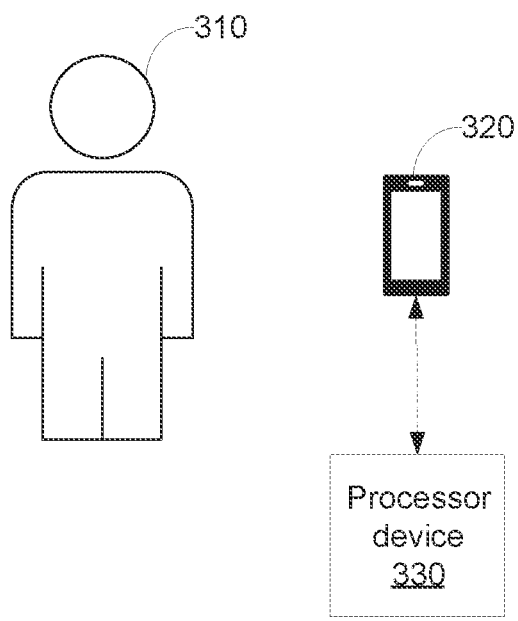
FIG. 3 is a block/flow diagram illustrating an exemplary environment for implementing face recognition based on unlabeled face data, in accordance with an embodiment of the present invention.

For example, referring now to FIG. 3, an exemplary environment 300 for implementing face recognition is shown. More specifically, the environment 300 includes a user 310 and a computing system or device 320. The computing system 320 can implement a biometric system that grants or denies the user 310 access to the computing system 320 based on an analysis of the face of the user 310. For example, in this illustrative embodiment, the computing system 320 is a smartphone that includes a camera. This embodiment is purely exemplary, and the face recognition model can be used to perform a face recognition task within any suitable environment.

As further shown, the environment 300 can further include at least one processor device 330. The processor device 330 can be configured to implement the system/method described herein for retraining a face recognition model. Although the processing device 330 is shown as being a separate entity from the computing system 320, the processor device 300 can alternatively be a subcomponent of the computer system 320, or the computer system 320 can be a subcomponent of the processor device 330.

Referring now to FIG. 4, a block/flow diagram is provided illustrating a system/method 400 for implementing face recognition based on unlabeled face data. The system/method 400 can improve the performance of a supervised face recognition model by clustering unlabeled face images, and retraining on both labeled and unlabeled face images using cluster assignments as pseudo-labels on additional unlabeled data.

At block 410, a face recognition model trained on labeled face data is obtained. For example, the labeled face data can be a set of labeled face images including a large-scale labeled dataset. In one embodiment, the labeled face data can include one or more human face images. However, such an embodiment should not be considered limiting, and the embodiments described herein can be applied to perform face recognition training with respect to any suitable face images.

In one embodiment, the obtaining the face recognition model includes training the face recognition model using a deep neural network to obtain a training loss. In this embodiment, training the neural network can include training the neural network on the set of labeled face images in a fully-supervised fashion as a baseline. Accordingly, the training performed at block 420 can be semi-supervised face recognition training.

At block 420, a plurality of unlabeled faces corresponding to unlabeled face data is separated, using a mixture of probability distributions, into a set of one or more overlapping unlabeled faces that include overlapping identities to those in the labeled face data and a set of one or more disjoint unlabeled faces that include disjoint identities to those in the labeled face data. More specifically, a mixture of extreme value distributions can be used to perform on-the-fly. In one embodiment, the mixture of extreme value distributions includes a mixture of Weibull distributions.

The separation problem solved at block 420 can be regarded as an "out-of-distribution detection problem," with an intuition that unlabeled face images with overlapping identities will have high confidence scores from a face recognition engine, as the same labeled data is used to train the face recognition engine. Since the softmax operation over several thousand categories can result in small values due to normalization, a maximum logit ("max-logit") for each unlabeled face image can be used as its corresponding confidence score. Therefore, thresholds of the confidence scores that can separate disjoint and overlapping IDs are searched for. Since we may be dealing with the maxima over a large number of classes, we can draw upon results from extreme value theory (EVT). The Fisher-Tippet theorem, also known as the extreme value theorem, provides that the limiting distribution of the maxima of independent and identically distributed (i.i.d.) random variables can converge to an extreme value distribution corresponding to one of a Gumbel distribution, a Fréchet distribution or a Weibull distribution.

At block 430, the one or more disjoint unlabeled faces are clustered using a graph convolutional network to generate one or more cluster assignments, including assigning a pseudo-label corresponding to a cluster assignment to each of the one or more disjoint unlabeled faces to obtain one or more pseudo-labeled samples. As will be described in further detail below, the cluster assignments/pseudo-labels corresponding to additional unlabeled face images will be incorporated during retraining of the face recognition network. More specifically, the clustering can leverage the graph convolutional network for large-scale face clustering using the pseudo-labels.

In one embodiment, the GCN is a Face-GCN. Based on features extracted from a pretrained face recognition engine, Face-GCN can construct a nearest-neighbor graph over all samples, where Euclidean distance can be used as the affinity measure. By setting various thresholds on the edge weights of this graph, a set of connected components or cluster proposals are generated. During training, the aim is to regress the precision and recall of the proposals arising from a single ground truth identity. Since the proposals are generated based on labeled face images, the Face-GCN can be trained in a fully supervised way. This is unlike the regular training of GCNs, which are typically trained with a classification loss, either for each node or an input graph as a whole. During testing, a "de-overlap" procedure similar to non-maximum suppression in object detection, can use predicted GCN scores for the proposals to partition an unlabeled dataset into a set of clusters.

At block 440, a clustering uncertainty associated with the one or more cluster assignments is generated. The clustering uncertainty corresponds to an estimate of incorrect clustering assignments within the set of clustered face images. The clustering uncertainty is generated to compensate for label noise introduced by clustering procedure and thus improve face recognition performance. More specifically, the clustering uncertainty will be incorporated into the retraining of the face recognition network by weighting the training loss to reduce the effect of erroneous gradients caused by the noisy labeled data. The clustering uncertainty does not require a clean labeled dataset to learn a training curriculum, and thus can be applied out-of-the-box.

At block 450, the face recognition model is retrained on the labeled face data and the unlabeled face data by incorporating the clustering uncertainty, including attenuating training loss of the one or more pseudo-labeled samples using the clustering uncertainty. That is, the retraining incorporates the clustering uncertainty of whether a pseudo-labeled face image was correctly labeled. Accordingly, retraining the original face recognition model on the union of the set of labeled face images and the set of clustered face images can improve face recognition performance.

More specifically, retraining the face recognition model can include, at block 452, feeding the labeled face data and the one or more pseudo-labeled samples into a neural network and, at block 454, attenuating training loss of the one or more pseudo-labeled samples by using the clustering uncertainty and an output of the neural network to obtain a weighted training loss.

At block 460, the face recognition model can be implemented to perform a face recognition task. In one embodiment, the face recognition model can be implemented within a biometric system that provides a user access to a computing system or device based on an analysis of the user's face. However, the face recognition model can be used to perform a face recognition task within any suitable environment. As described herein above, the performance of the face recognition task can be improved by retraining the face recognition model in accordance with the embodiments described herein.

Further details regarding blocks 410-470 are described above with reference to FIGS. 1-3.

Figure 5:
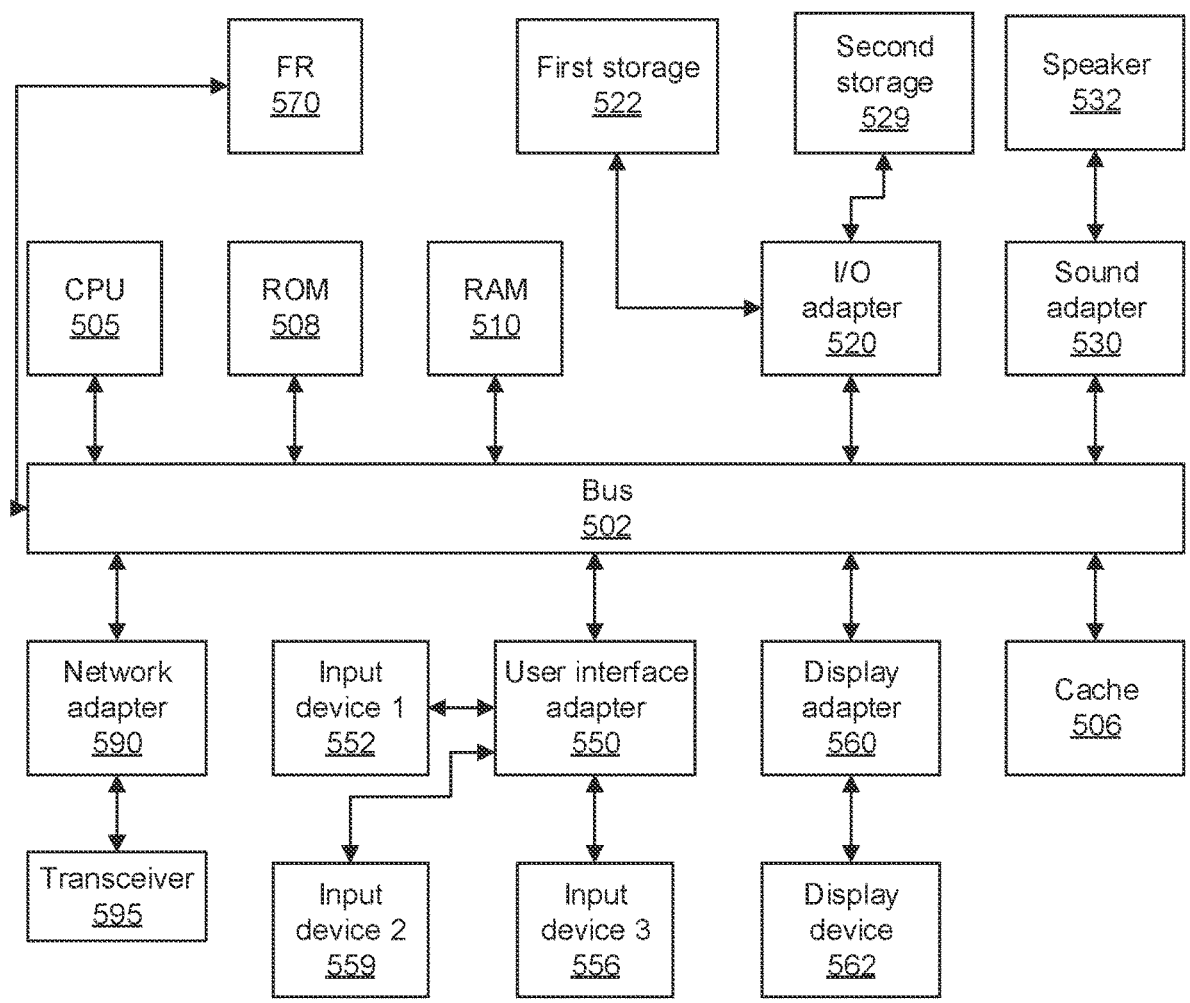
FIG. 5 is a block/flow diagram illustrating a computer system, in accordance with an embodiment the present invention.

Referring now to FIG. 5, an exemplary computer system 500 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 520, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices. The user input devices 552, 559, and 556 are used to input and output information to and from system 500.

Face recognition (FR) component 570 may be operatively coupled to system bus 502. FR component 570 is configured to perform one or more of the operations described above. FR component 570 can be implemented as a standalone special purpose hardware device, or may be implemented as software stored on a storage device. In the embodiment in which FR component 570 is software-implemented, although shown as a separate component of the computer system 500, FR component 570 can be stored on, e.g., the first storage device 522 and/or the second storage device 529. Alternatively, FR component 570 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. Computer-implemented method for implementing face recognition, comprising:
   obtaining a face recognition model trained on labeled face data;
   separating, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data;
   clustering the one or more disjoint unlabeled faces using a graph convolutional network to generate one or more cluster assignments, including assigning a pseudo-label corresponding to a cluster assignment to each of the one or more disjoint unlabeled faces to obtain one or more pseudo-labeled samples;
   generating a clustering uncertainty associated with the one or more cluster assignments; and
   retraining the face recognition model on the labeled face data and the unlabeled face data to improve face recognition performance by incorporating the clustering uncertainty;
   wherein retraining, the face recognition model further includes:
   feeding the labeled face data and the one or more pseudo-labeled samples into a neural network; and
   attenuating a training loss of the one or more pseudo-labeled samples b using the clustering uncertainty and an output of the neural network to obtain a weighted training loss.

2. The method as recited in claim 1, wherein the deep neural network is trained on labeled faces in a fully-supervised fashion.

3. The method as recited in claim 1, wherein the mixture of probability distributions includes a mixture of Weibull distributions.

4. The method as recited in claim 1, wherein obtaining the estimated clustering uncertainty further includes learning an unsupervised model of a likelihood of incorrect cluster assignments.

5. The method as recited in claim 1, further comprising implementing the face recognition model to perform a face recognition task.

6. The method as recited in claim 5, wherein the face recognition model is implemented within a biometric system that provides a user access to a computing system or device based on an analysis of the user's face.

7. A computer program product comprising a non-transitory computer readable storage medium having program instructions embodied therewith, the program instructions executable by a computer to cause the computer to perform a method for implementing face recognition, the method performed by the computer comprising;
    obtaining a face recognition model trained on labeled face data;
    separating, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data;
    clustering the one or more disjoint unlabeled faces using a graph convolutional network to generate one or more cluster assignments, including assigning a pseudo-label corresponding to a cluster assignment to each of the one or more disjoint unlabeled faces to obtain one or more pseudo-labeled samples;
    generating a clustering uncertainty associated with the one or more cluster assignments; and
    retraining the face recognition model on the labeled face data and the unlabeled face data to improve face recognition performance by incorporating the clustering uncertainty;
    wherein retraining the face recognition model further includes:
    feeding the labeled face data and the one or more pseudo-labeled samples into a neural network; and
    attenuating a training loss of the one or more pseudo-labeled samples by using the clustering uncertainty and an output of the neural network to obtain a weighted training loss.

8. The computer program product as recited in claim 7, wherein the deep neural networks is trained on labeled faces in a fully-supervised fashion.

9. The computer program product as recited in claim 7, wherein the mixture of probability distributions includes a mixture of Weibull distributions.

10. The computer program product as recited in claim 7, wherein obtaining the estimated clustering uncertainty further includes learning an unsupervised model of a likelihood of incorrect cluster assignments.

11. The computer program product as recited in claim 7, wherein the method further includes implementing the face recognition model to perform a face recognition task.

12. The computer program product as recited in claim 11, wherein the face recognition model is implemented within a biometric system that provides a user access to a computing system or device based on an analysis of the user's face.

13. A system for implementing face recognition, comprising:
    a memory device storing program code; and
    at least one processor device operatively coupled to the memory device and configured to execute program code stored on the memory device to:
        obtain a face recognition model trained on labeled face data;
        separate, using a mixture of probability distributions, a plurality of unlabeled faces corresponding to unlabeled face data into a set of one or more overlapping unlabeled faces that include overlapping identities to those in the labeled face data and a set of one or more disjoint unlabeled faces that include disjoint identities to those in the labeled face data;
        cluster the one or more disjoint unlabeled faces using a graph convolutional network to generate one or more cluster assignments by assigning a pseudo-label corresponding to a cluster assignment to each of the one or more disjoint unlabeled faces to obtain one or more pseudo-labeled samples;
        generate a clustering uncertainty associated with the one or more cluster assignments; and
        retrain the face recognition model on the labeled face data and the unlabeled face data to improve face recognition performance by incorporating the clustering uncertainty;
        wherein the at least one processor device is further configured to retrain the face recognition model by;
        feeding the labeled face data and the one or more pseudo-labeled samples into a neural network; and
        attenuating a training loss of the one or more pseudo-labeled samples by using the clustering uncertainty and an output of the neural network to obtain a weighted training loss.

14. The system as recited in claim 13, wherein the deep neural network trained on labeled faces in a fully-supervised fashion.

15. The system as recited in claim 11, wherein of probability distributions includes a mixture of Weibull distributions.

16. The system as recited in claim 13, Wherein the at least one processor device is further configured to generate the clustering uncertainty by learning an unsupervised model of a likelihood of incorrect cluster assignments.

17. The system as recited in claim 13, Wherein the at least one processor device is further configured to execute program code stored on the memory device to implement the face recognition model to perform a face recognition task, and wherein the face recognition model is implemented within a biometric system that provides a user access to a computing system or device based on an analysis of the user's face.

* * * * *